United States Patent [19]

Smith

[11] Patent Number: 5,627,703

[45] Date of Patent: May 6, 1997

[54] DUAL MAGNETORESISTIVE REPRODUCE HEAD UTILIZING MULTILAYER MAGNETORESISTIVE SENSING ELEMENTS

[75] Inventor: Neil Smith, San Diego, Calif.

[73] Assignee: Eastman Kodak Company, Rochester, N.Y.

[21] Appl. No.: 501,278

[22] Filed: Jul. 17, 1995

Related U.S. Application Data

[63] Continuation of Ser. No. 208,755, Mar. 9, 1994, abandoned.

[51] Int. Cl.$^6$ ............................................. G11B 5/39
[52] U.S. Cl. ............................................. 360/113
[58] Field of Search ........................ 360/113; 338/32 R; 324/252

[56] References Cited

U.S. PATENT DOCUMENTS

| | | | |
|---|---|---|---|
| 4,103,315 | 7/1978 | Hempstead et al. | 360/113 |
| 4,896,235 | 1/1990 | Takino et al. | 360/113 |
| 5,134,533 | 7/1992 | Friedrich et al. | 360/113 |
| 5,287,238 | 2/1994 | Baumgart et al. | 360/113 |
| 5,304,975 | 4/1994 | Saito et al. | 360/113 |
| 5,313,186 | 5/1994 | Schuhl et al. | 360/113 |
| 5,315,282 | 5/1994 | Shinjo et al. | 360/113 |
| 5,341,118 | 8/1994 | Parkin et al. | 360/113 |
| 5,341,261 | 8/1994 | Dieny et al. | 360/113 |
| 5,452,163 | 9/1995 | Coffey et al. | 360/113 |

*Primary Examiner*—Craig A. Renner
*Attorney, Agent, or Firm*—William F. Noval

[57] ABSTRACT

A spin-valve dual magnetoresistance reproduce head (SV-DMR), consists of two spin valve sensor elements configured such that the two individual spin valve elements are physically separated by a relatively high resistivity conductive gap spacer. As in a conventional dual magnetoresistive head (DMR) there is sense current flow through the SV-DMR, and signal generated magnetoresistance changes are detected as head output voltage variations. The SV-DMR eliminates the need for an exchange coupled pinning layer or the mismatch of spin valve layers to implement the perpendicular biasing arrangement disclosed in the prior art. The required perpendicular biasing is attained solely by the interaction between substantially equal thickness magnetic layers of the SV-DMR and the internal magnetic fields arising from the flow of the sense current in the device. The inherent high resolution of the prior art DMR is retained in the SV-DMR, and is effectively combined with the high output signal capability provided by the use of spin valve magnetoresistance elements.

14 Claims, 5 Drawing Sheets

DUAL MAGNETORESISTIVE REPRODUCE HEAD UTILIZING MULTILAYER MAGNETORESISTIVE SENSING ELEMENTS

This is a continuation of U.S. application Ser. No. 08/208,755, filed Mar. 9, 1994, now abandoned.

BACKGROUND OF THE INVENTION

1. Field of the Invention

This invention relates to a magnetic reproduce head, and in particular to a magnetoresistive reproduce head.

2. Description of the Prior Art

As magnetic recording technology continues to push a real recording density limits, magnetoresistive (MR) reproduce heads appear to be the technology of choice. Recent U.S. Pat. Nos. 5,084,794 and 5,193,038 disclose dual magnetoresistive (DMR) reproduce heads which offer improved high linear density performance compared to conventional shielded magnetoresistive (SMR) heads, as well more robust operation and simpler fabrication. U.S. Pat. Nos. 5,084,794 and 5,193,038 are hereby incorporated by reference. Until very recently, virtually all past magnetoresistive sensor/heads, including the DMR design, have been based on the physical phenomenon of anisotropic magnetoresistance (AMR) in Permalloy (NiFe) thin films. U.S. Pat. No. 5,309,303 discloses a magnetoresistive sensor employing the relatively recently discovered "spin-valve" (SV) effect, which is fundamentally distinct from the AMR effect. Sensors or heads based on spin-valve technology can potentially yield significantly greater intrinsic sensitivity and signal levels than any design of conventional the AMR-based sensor or head.

Ideally the basic SV sensing element is a trilayer film of two thin-film magnetic layers sandwiching a very thin non-magnetic conductor. Referring to FIGS. 1a, 1b the basic SV sensor of the prior art consists of the two magnetic layers 10, 12 of thicknesses $t_1$ and $t_2$ respectively, separated by a nonmagnetic conductive spacer 14 of thickness $t_g$, all deposited on a substrate 11. It is to be noted that this SVMR sandwich of magnetic layers 10, 12 and spacer 14 corresponds to the single magnetoresistive film of the prior art AMR sensor. In general, the individual magnetic layers 10, 12 may be either single or multiple layers generally of Co, Fe, and/or Ni; the conductive spacer is generally Au, Ag or Cu. Due to the "spin-valve" effect, the resistivity $\rho$ of the SV trilayer has a component which depends upon the cosine of the angle between magnetization vectors $M_1$ and $M_2$ in the films 10, 12, as will be described below. Depending upon film composition, SV trilayers have been observed to have a magnetoresistive coefficient $\Delta_\rho \rho_0$ as large as 8%. This is nearly four times larger than typically found for traditional AMR in NiFe, which accounts for the current substantial interest in SV technology for magnetic recording heads.

The sensor geometry of FIGS. 1a, 1b is designed for detecting magnetic fields $H_s$ along the direction transverse to the SV stripe. Such fields will rotate the magnetization directions, i.e. $M_1$, $M_2$ in either magnetic film 10, 12, thereby inducing a change in the magnetoresistive component of $\rho$. This in turn changes the net electrical resistance of the SV stripe, creating a voltage change across the terminals of the SV sensor when a constant sense current is passing through the device. In general, the magnetoresistive component of $\rho$ varies as $\Delta_\rho \cos(\theta_1-\theta_2)$, where $\theta_1$ is the angle between the magnetization $M_1$ and the longitudinal direction of the film 10, and $\theta_2$ is the angle between the magnetization $M_2$ and the longitudinal direction of the film 12. Therefore, it is necessary that the films 10 and 12 respond differently to signal fields such that the difference $\theta_1-\theta_2$ will vary with the field.

For the SV head as disclosed in U.S. Pat. No. 5,159,513, the magnetization $M_2$ is "pinned" at $|\theta_2|=90°$, and resultantly the magnetoresistive component of $\sigma$ varies as $\Delta_\rho \sin \theta_1$. Due to magnetization rotation, $\sin \theta_1$ is proportional to the net transverse signal field H. If $\theta_1 \cong 0$ at the zero-field quiescent bias point of the SV sensor, the "sensor output" ∝ "change in $\rho$" ∝ "change in $\sin \theta_1$," ∝ "signal field H", and the SV responds linearly to the signal fields over the maximum possible dynamic range $-90° \leq \theta_1 \leq 90°$ prior to the saturation of the film 10. This illustrates why the perpendicular bias state $\theta_1 \cong 0°$ and $\theta_2 \cong 90°$ the most desirable for practical application of the SV type magnetoresistive head.

In a practical SV sensor some means is required for pinning the direction of magnetization $M_2$ of the magnetic layer 12 so that it is substantially perpendicular to the quiescent magnetization $M_1$ of the magnetic layer 12, which is otherwise free to rotate in response to a magnetic signal field. The preferred means for stabilizing this perpendicular magnetization state as taught in U.S. Pat. No. 5,159,513 entails two distinct features. Firstly, it requires that there be a thickness and/or composition mismatch between the two magnetic SV layers, and secondly, it involves an additional magnetic biasing layer, i.e. the exchanged coupled biasing layer 16 of FIGS. 1a, 1b.

FIG. 1b shows the cross section of the SV sensor of FIG. 1a, including deposited current leads 18, 20.

A simplified schematic representation of the perpendicularly biased SV of U.S. Pat. No. 5,159,513 illustrates some critical structural and related magnetic features inherent in the design. As taught in the referenced patent, films 10, 12 are Co based alloys and/or NiFe, pinning layer 16 is antiferromagnetic FeMn, and spacer 14 is Cu. The thicknesses of the films 10, 12, 16 and the spacer 12 are as follows: film 10; $t_1 \approx 7.5$ nm, film 12; $t_2 \approx 3.5$ nm, film 16; $t_3 \approx 10$ nm, and spacer 14; $t_g \approx 3$ nm. All elements are of height L in the transverse direction. Also diagrammed are the transverse magnetic fields present under bias conditions (excluding signal fields), including demagnetization fields $H_d$ and current fields $H_j$ arising from the current density J flowing in the device. There are several possible drawbacks to this design: viz, a) The design requires a thickness or composition mismatch between the films 10 and 12, and this should be detrimental to the maximum achievable magnitude of $(\Delta_{92}/\rho)$. This is because the basic spin-valve effect requires sharing of conduction electrons between the two magnetic layers (through the Cu spacer), and this is done most equally and efficiently when the magnetic layers are nominally the same, that is, when the thicknesses of the films 10, 12 are equal. In practice, there are several reasons why such a thickness mismatch may be unavoidable. Generally, $\theta_1 \propto (H_j+H_d)/t_1$, so that for $\theta_1$ to be near 0°, it is necessary that $t_1$ be sufficiently large, and that at film 10 the demagnetization and the current fields approximately cancel. The direction of current flow J in FIG. 2 was deliberately chosen such that $H_j$ is antiparallel to $H_d$ at the site of film 10. However, $H_d \propto t_2/L$, while $H_j \propto J(t_2+t_g)$, and for the small element heights, $L \approx 1$ μm required in future high density MR reproduce heads, it is unlikely that $H_j$ will be large enough to cancel $H_d$ at practical maximum allowable current density without $t_1$ being significantly larger than $t_2$. Additionally, the exchange pinning strength on film 12 due to film 16 scales as $1/t_2$, and achieving sufficient pinning strength to maintain $\theta_2 \cong 90°$ can require reducing $t_2$ below minimum thickness requirements on $t_1$ necessary to avoid saturation of film 10 by signal fields.

b) As taught in U.S. Pat. No. 5,159,513, the last deposited pinning layer 16 is an electrical conductor (as is FeMn) so that sense current from the current leads 18,20 deposited atop film 16 could travel down into the SV trilayer. The presence of a conductive pinning layer shunts sense current away from the SV layers, thereby resulting in a loss of output signal from the device.

c) The most common exchange pinning material used to date, FeMn, is well known to be corrosive, and thus long term durability of the disclosed prior art SV head would be a potentially serious problem. The problem is made worse by the fact that in the present case, the FeMn is in the active area of the SV device, where high current densities and associated Joule heating may accelerate the corrosion. Such heating in the active area is also bad in that the pinning strength of an FeMn exchange-coupling layer can decay significantly with increasing temperature. This temperature problem is exacerbated by the possibility of a slow long term re-annealing of the FeMn in the presence of the magnetic field of $H_d + H_j$ at the site of the interface between films 10 and 12 where $H_d$ and $H_j$ are in the same direction, and oppose the pinned magnetization direction of film 12. Such re-annealing would progressively destroy the transverse pinning of film 12 and render the SV device nonfunctional.

d) The intrinsic linear resolution of a SV reproduce head is not sufficient for a high density recording system, and analogously to the conventional AMR head technology, the presence of additional magnetic shielding as part of the total head design will be required. The shields add cost and complexity in fabricating the head, particularly as the shield/sensor gap spacing must be reduced to accommodate future requirements on increasing storage densities.

SUMMARY OF THE INVENTION

The present invention is aimed at overcoming all four of the limitations of the prior art SV head design described above. The invention, referred herein as an SV-DMR (spin-valve dual magnetoresistance) device, consists of two SV sensor elements configured such that the two individual SV elements are physically separated by a relatively high resistivity conductive gap spacer. As in a conventional DMR head there is sense current flow through the SV-DMR, and signal generated magnetoresistance changes are detected as head output voltage variations. The SV-DMR eliminates the need for an exchange coupled pinning layer or the mismatch of SV layers to implement the perpendicular biasing arrangement of the prior art. The required perpendicular biasing is attained solely by the interaction between substantially equal thickness magnetic layers of the SV-DMR and the internal magnetic fields arising from the flow of the sense current in the device. The inherent high resolution of the prior art DMR disclosed in U.S. Pat. Nos. 5,084,794 and 5,193,038 is retained in the SV-DMR, and is effectively combined with the high output signal capability provided by the use of SV magnetoresistance elements.

BRIEF DESCRIPTION OF THE DRAWINGS

The invention will be described with respect to the figures, of which.

DESCRIPTION OF THE PREFERRED EMBODIMENT

Figure 1A:
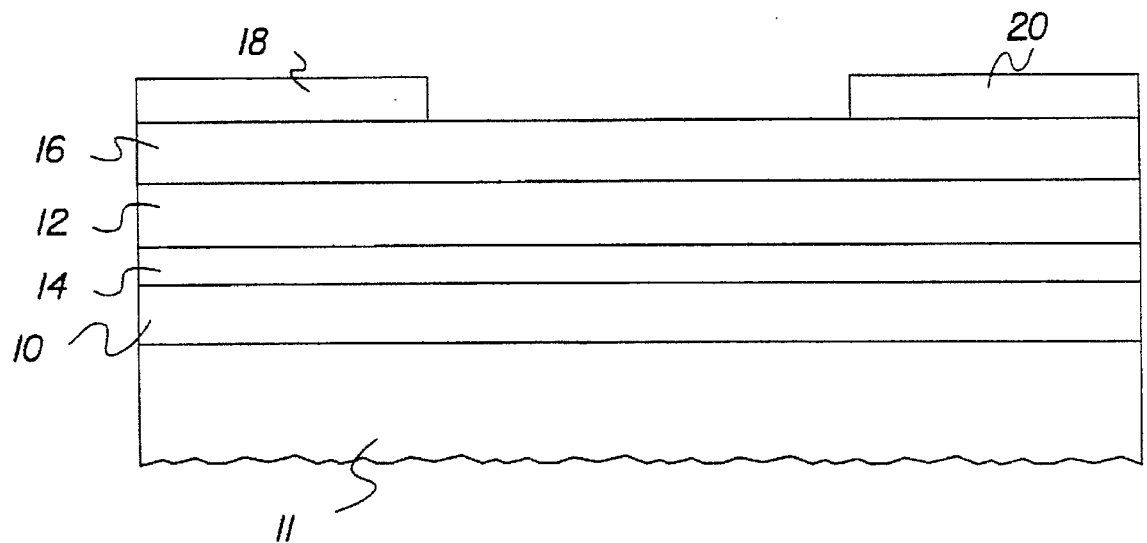
FIGS. 1a and 1b are drawings of a spin valve magnetoresistive head known in the prior art.
Figure 1B:
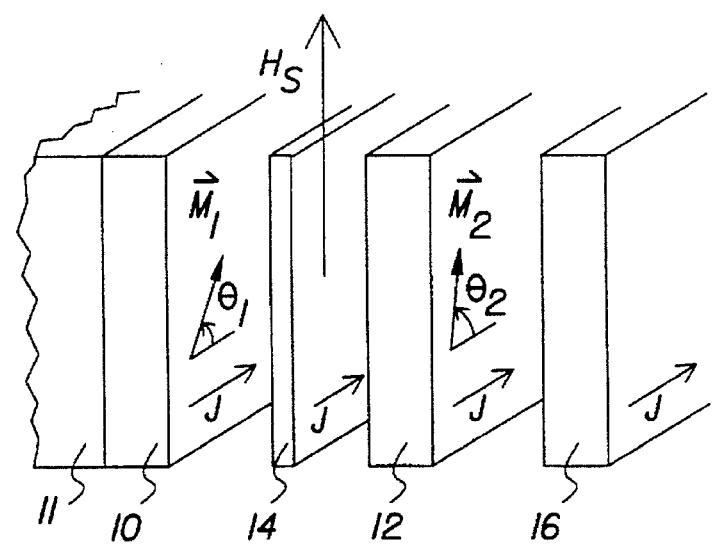
Figure 2:
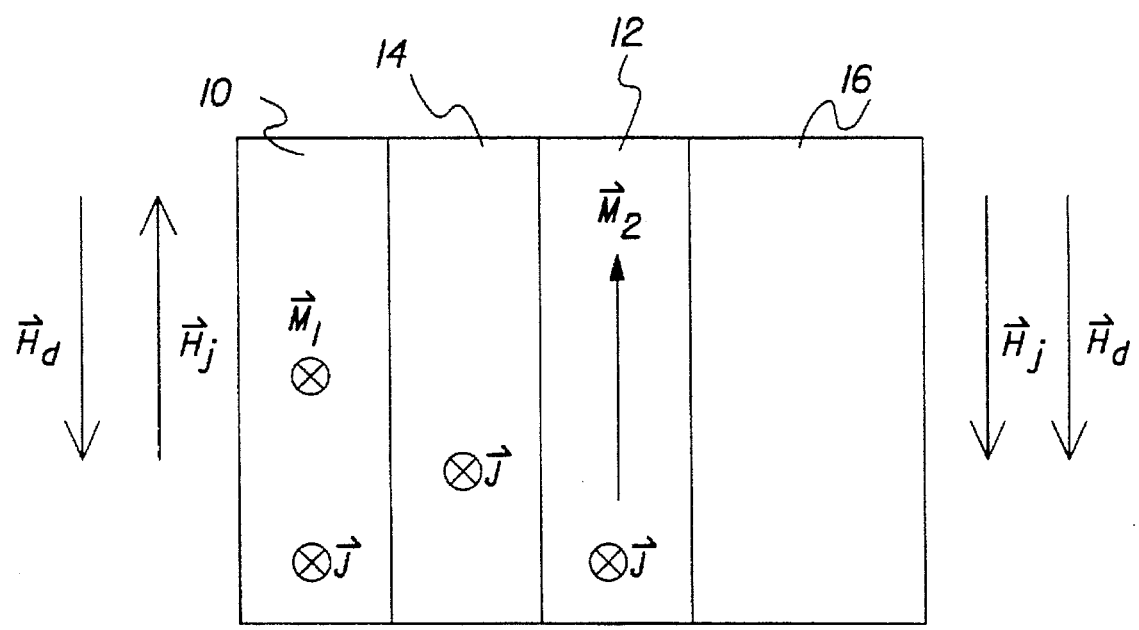
FIG. 2 is a schematic drawing of the elements of the head of FIGS. 1a and 1b illustrating the directions of relevant magnetic fields.
Figure 3A:
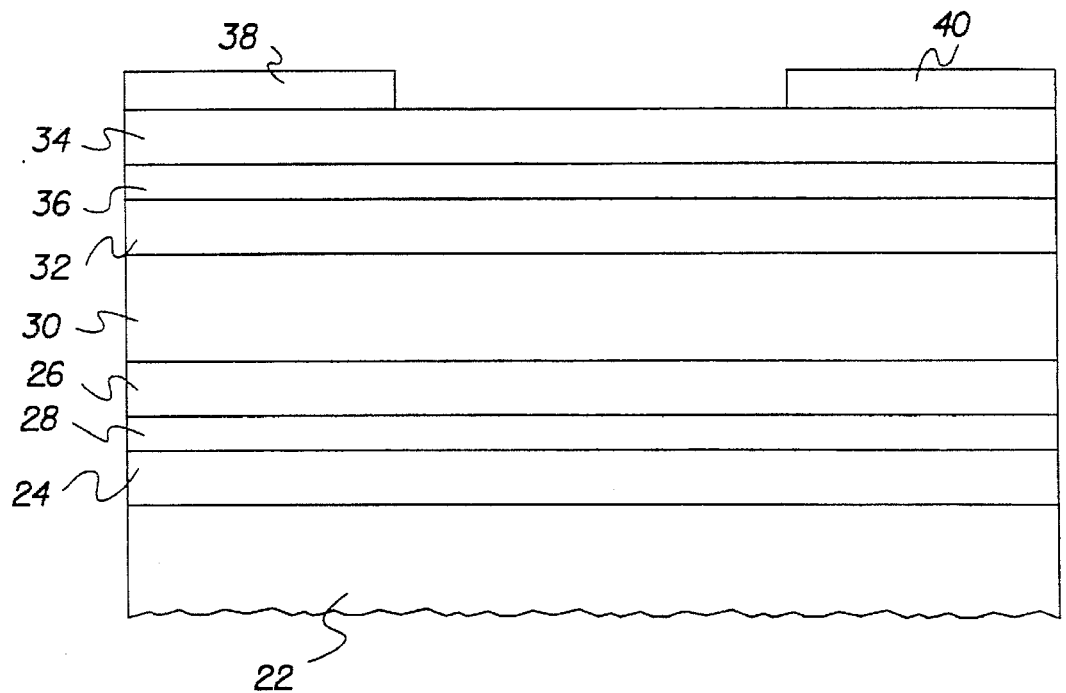
FIGS. 3a and 3b are drawings of a dual magnetoresistive head utilizing spin valve magnetoresistive elements according to the present invention.
Figure 3B:
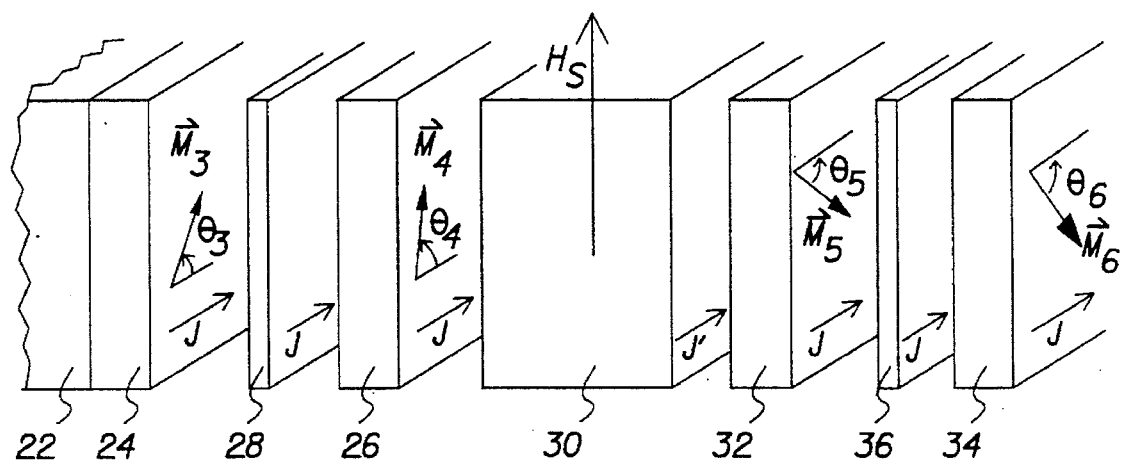

In the views of the SV-DMR of the invention of FIGS. 3a, 3b, a trilayer comprising the magnetic layer 24, spacer 28, and magnetic layer 26 is deposited on a substrate 22. A conductive gap spacer 30 is then deposited, followed by a second trilayer comprising the magnetic layer 32, spacer 36 and magnetic layer 34. The layers 24,26,32, 34 are each either single or multiple layer alloys of Co, Fe, and/or Ni, as previously specified for the conventional SVMR, and the spacers 28, 36 are correspondingly either Cu, Ag, or Au. In accordance with the present invention, the thickness and the composition of magnetic layers 24,26 and 32,34 may be substantially the same. The central gap spacer 30 is made of a relatively high resistivity material to limit current shunting from the SV elements, yet provide an electrical path from the current leads 38,40 deposited atop layer 34 ( or alternately, atop an additional optional conductive passivation layer) to both SV trilayers. A suitable material for the central gap spacer 30 is TiN, which can provide suitably high resistivity of 100–1000 $\mu\Omega$-cm.

Figure 4:
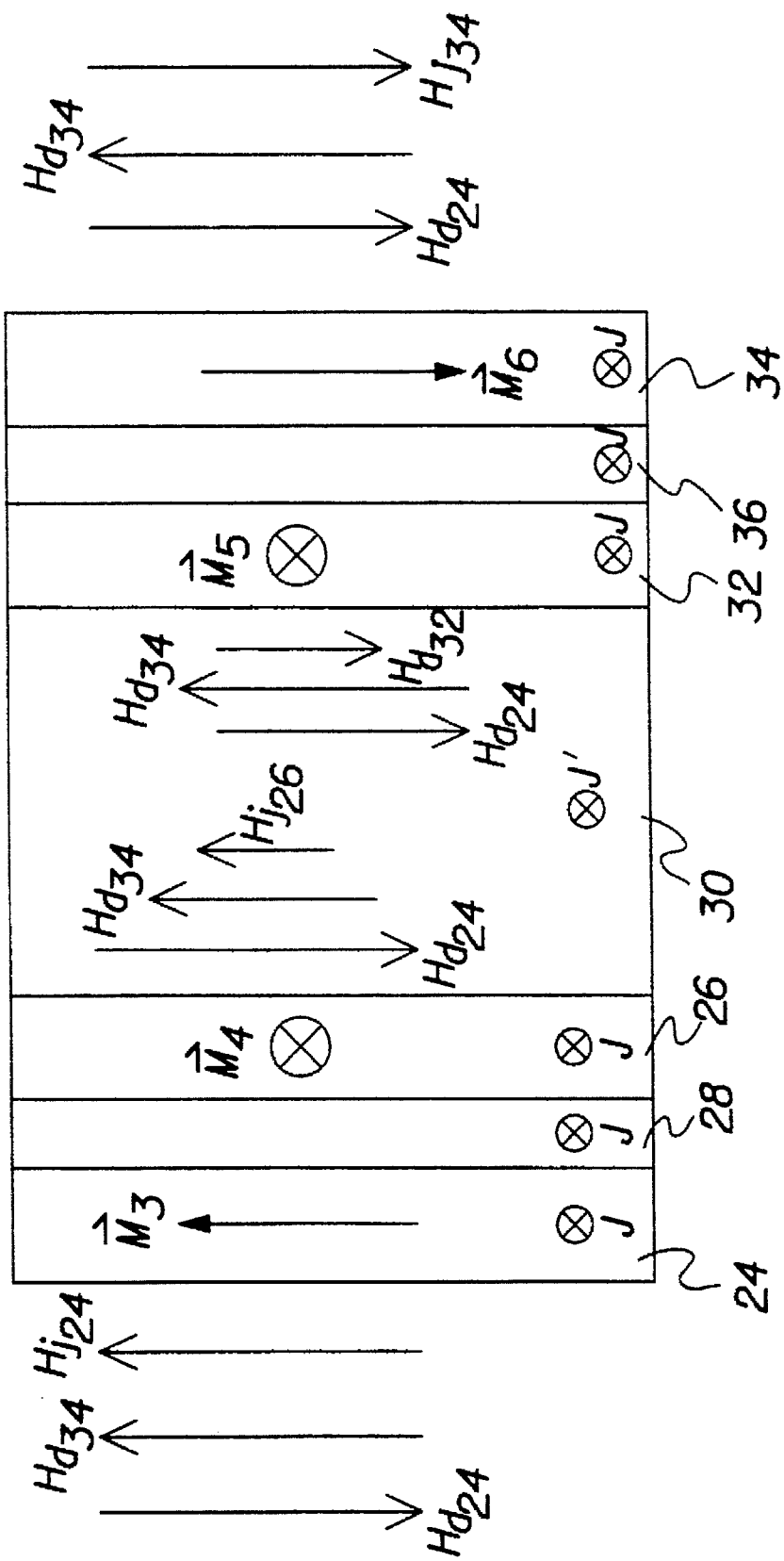
FIG. 4 is a schematic drawing of the dual magnetoresistive head of FIGS. 3a and 3b illustrating the directions of relevant magnetic fields.

By consideration of FIG. 4, it may be understood how the SV-DMR simultaneously achieves a close approximation to the ideal perpendicular bias configuration for both SV trilayers without the use of additional pinning layers, and without requiring any thickness mismatch between the magnetic layers of either SV trilayer. It will be first noted that the structure of FIG. 4 is physically symmetrical about a center line through the spacer 30, and resultantly is "antisymmetrical" with respect to the magnetic fields generated by the current total flowing through the device. In view of this, an explanation of the magnitudes of the fields at the trilayers left of the spacer 30, i.e. at layers 24,26, is the same as that for the fields at the layers 32,34. (As noted, the antisymmetry affects only the current generated fields directions, not their magnitudes.) In FIG. 4, the fields acting on each magnetic layer of a trilayer is represented by the field vectors shown directly adjacent to the layer, with the following notational conventions. $H_{dx}$ is the demagnetization field arising from magnetic layer "x", and when shown adjacent to any particular magnetic layer, it acts on that layer. $H_{jy}$ is the current field acting on magnetic layer "y", and arises from the current distribution flowing in all the other magnetic layers. J' is the current density flowing in the spacer 30.

Considering the resultant fields at the magnetic layers to the left of the center line of the spacer 30, the current field $H_{j24}$ on the outer layer 24 resulting from the current flowing in the other conducting layers superimpose to maximize the magnitude of $H_{j24}$. In the case of the inner layer 26, the current fields from current flowing in the majority of layers to the right of layer 26 are partially canceled by that current flowing in those fewer layers to the left of layer 26, so that $H_{j24}$ is nearly three times larger in magnitude than $H_{j26}$. Further, since layers 24 and 34 are magnetized in opposite directions, the transverse demagnetizing field $H_{d24}$ due to layer 24, at the site of layers 24 or 26, is substantially canceled out by the demagnetization field $H_{d34}$. With the right choices of parameters, the large asymmetry in current field strength between inner and outer magnetic layers, combined with the substantial reduction in net demagnetizing field, can enable establishment of a quasi-perpendicular bias configuration with the outer layer 24 being effectively pinned transversely because $|H_{j24}|>|H_{d24}-H_{d34}|$, and the inner layer 26 remaining biased at $\theta_4$ near 0° because $H_{j26}$ is approximately canceled out by the net demagnetization field $|H_{d24}-H_{d34}|$. It will be appreciated that this same explanation is applicable to the magnetic field conditions in the SV-DMR to the right of the center line.

For the SV-DMR, the magnetoresistive part of $\rho$ is $\propto \Delta_\rho/\rho (\cos(\theta_3-\theta_4)+(\cos(\theta_4-\theta_5))/2$, which in the case of $\theta_3 \cong 90°$ and $\theta_5 \cong -90°$, means that $\rho$ is $\propto \Delta_\rho/\rho (\sin\theta_3-\sin\theta_4)/2$. Thus, analogous to the conventional AMR-DMR the SV-DMR output signal measures the difference $(\sin\theta_3-\sin\theta_4)$ in angular rotation between magnetic layers 26 and 32. To the extent that the magnetizations $M_3$ and $M_6$ of the layers 24,34 remain effectively pinned, or saturated at ±90°, the magnetics of the SV-DMR is analogous to that of the AMR-DMR, and the SV-DMR reproduce head will retain the AMR-DMR qualities of performance at high recording densities with large intrinsic linear resolution limited by the size of the gap spacer 30. It will also be noted that the SV-DMR operates in the same manner whether the bias point magnetizations $M_4$, $M_5$ of layers 26,32 are parallel as shown in FIG. 4, or antiparallel, since $\sin\theta=\sin(180°-\theta)$.

Figure 5:
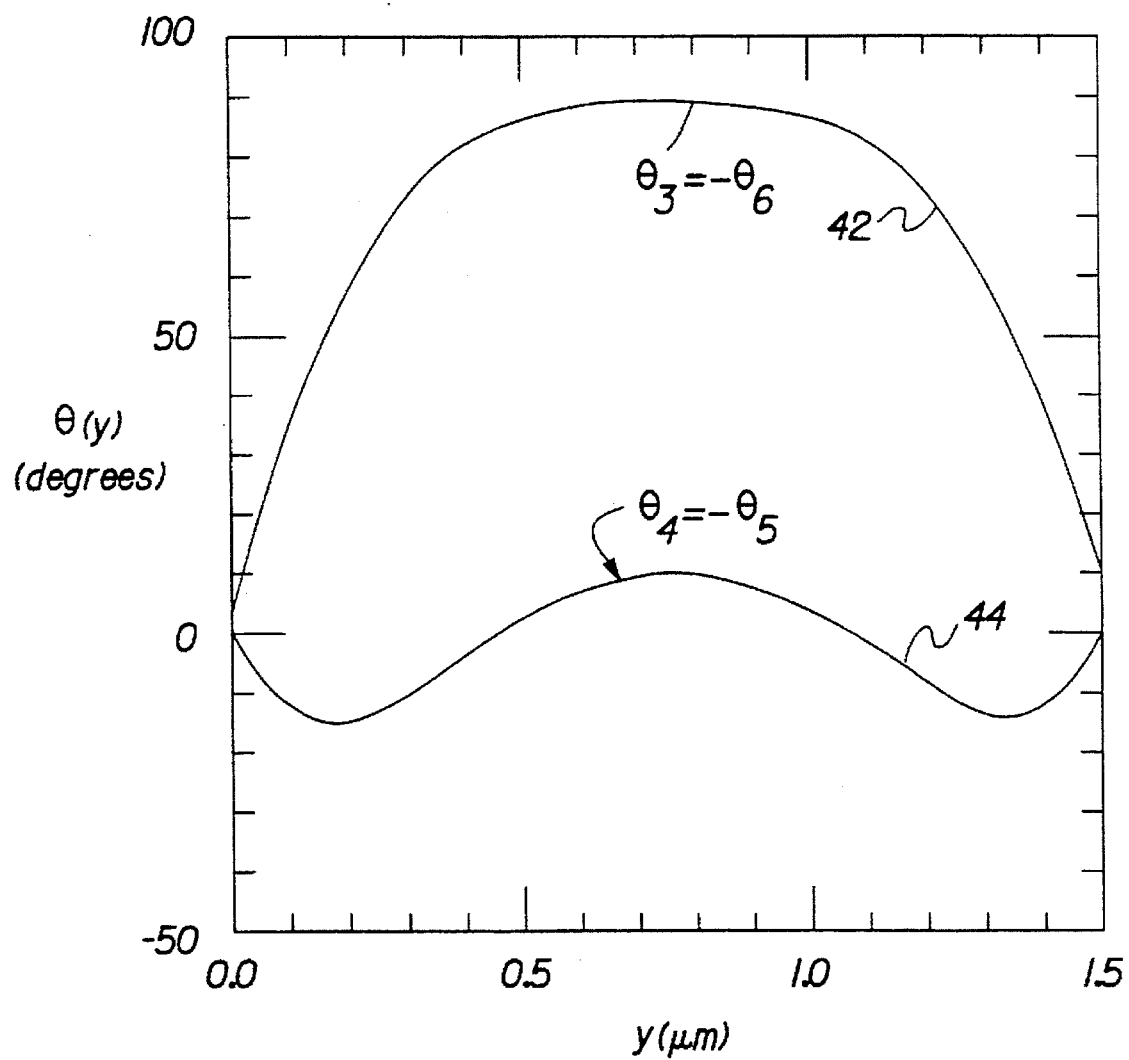
FIG. 5 is graph illustrating the angular bias directions of elements of the dual magnetoresistive head of the invention.

FIG. 5 shows the results of a two-dimensional micromagnetic calculation of the detailed bias distribution $\theta(y)$ for a SV-DMR with all magnetic layers chosen to be identical. Parameters include L=1.5 µm, magnetic layers 24,26,32,34 of equal thickness equal to 8 nm, spacers 28,36 of thickness 3 nm, current density J=1.6×10$^7$ amp/cm² in either SV element, saturation flux density $B_s$=1.2 Kg and anisotropy field $H_K$=8 Oe. The resistivity of the central conducting gap spacer 30 with thickness 60 nm is assumed to be chosen so that it shunts 10% of the total sense current. Exchange coupling between magnetic layers across the thin conductors 28,36 is assumed to be zero. As seen in graph 44, the $|\theta_4$ or $\theta_5|\leq 20°$ with mean values near 0°. Similarly, as seen in graph 42, the outer magnetic layers 24,34 are pinned (i.e. well saturated) with $|\theta_3$ or $\theta_6|\cong 90°$ over the central half of the element height, L. The non-uniformities over the element height are unavoidable consequences of the non-uniformity in the demagnetizing fields near the element edges, but do not interfere with the essential operation of the SV-DMR as described.

The invention has been described in detail with particular reference to preferred embodiments thereof, but it will be understood that variations and modifications can be effected within the spirit and scope of the invention.

What is claimed is:

1. A magnetoresistive reproduce head comprising:

a) a substrate, b) a spin valve structure deposited on said substrate, said structure consisting of a first trilayer, a second trilayer and a central conductive non-magnetic non-antiferromagnetic spacer between said first and second trilayers, said first trilayer consisting of first and second ferromagnetic layers and a first conductive non-magnetic non-antiferromagnetic single layer, said first ferromagnetic layer deposited on said substrate, said first conductive non-magnetic non-antiferromagnetic single layer deposited on and in direct contact with said first ferromagnetic layer, and said second ferromagnetic layer deposited on and in direct contact with said first conductive non-magnetic non-antiferromagnetic single layer, said central conductive non-magnetic non-antiferromagnetic spacer deposited on and in direct contact with said second ferromagnetic layer, said second trilayer consisting of third and fourth ferromagnetic layers and a second conductive non-magnetic non-antiferromagnetic single layer, said third ferromagnetic layer deposited on and in direct contact with said central conductive non-magnetic non-antiferromagnetic spacer, said second conductive non-magnetic non-antiferromagnetic single layer deposited on and in direct contact with said third ferromagnetic layer, said fourth ferromagnetic layer deposited on and in direct contact with said second conductive non-magnetic non-antiferromagnetic single layer, c) means for producing a current flow through said magnetoresistive reproduce head to generate magnetic bias fields which magnetize said first ferromagnetic layer, said second ferromagnetic layer, said third ferromagnetic layer and said fourth ferromagnetic layer such that said first and said fourth ferromagnetic layers are magnetized substantially antiparallel to each other, said first and said second ferromagnetic layers are magnetized substantially perpendicular to each other, and said third and said fourth ferromagnetic layers are magnetized substantially perpendicular to each other, and d) means for differentially sensing the variations of resistivity of said first and second trilayers of said magnetoresistive head in response to an applied magnetic field.

2. The magnetoresistive reproduce head of claim 1, wherein said first and said fourth ferromagnetic layers are substantially identical in magnetic and electrical properties, and said second and said third ferromagnetic layers are substantially identical in magnetic and electrical properties.

3. The magnetoresistive reproduce head of claim 1, wherein said ferromagnetic layers are layers fabricated from at least one of the group consisting of Co, Fe, and Ni.

4. The magnetoresistive reproduce head of claim 3, wherein said first and said second conductive non-magnetic non-antiferromagnetic single layers are fabricated from at least one of the group consisting of Au, Ag, and Cu.

5. The magnetoresistive reproduce head of claim 1, wherein said first, said second, said third, and said fourth ferromagnetic layers are each of equal thickness.

6. The magnetoresistive reproduce head of claim 1, wherein said first and said second conductive non-magnetic non-antiferromagnetic single layers are each of a thickness less than the thickness of each individual layer of said ferromagnetic layers.

7. The magnetoresistive reproduce head of claim 1, wherein said conductive non-magnetic non-antiferromagnetic spacer has a resistivity higher than that of said first and second trilayers.

8. A magnetoresistive head assembly for detecting magnetically recorded signals having a characteristic recorded minimum bit length, said head assembly comprising:

a) a substrate, b) a spin valve structure deposited on said substrate, said structure consisting of a first trilayer, a second trilayer and a central conductive non-magnetic non-antiferromagnetic spacer between said first and second trilayers, said first trilayer consisting of first and second ferromagnetic layers and a first conductive non-magnetic non-antiferromagnetic single layer, said first ferromagnetic layer deposited on said substrate, said first conductive non-magnetic non-antiferromagnetic single layer deposited on and in direct contact with said first ferromagnetic layer, and said second ferromagnetic layer deposited on and in direct contact with said first conductive non-magnetic non-antiferromagnetic single layer, said central conductive non-magnetic non-antiferromagnetic spacer deposited on and in direct contact with said second ferromagnetic layer and having a thickness substantially equal to said characteristic recorded bit length, said second trilayer consisting of third and fourth ferromagnetic layers and a second conductive non-magnetic non-antiferromagnetic single layer, said third ferromagnetic layer deposited on and in direct contact with said central conductive non-magnetic non-antiferromagnetic spacer, said second conductive non-magnetic non-antiferromagnetic single layer deposited on and in direct contact within said third ferromagnetic layer, said fourth ferromagnetic layer deposited on and in direct contact with said second conductive non-magnetic non-antiferromagnetic single layer, (c) means for producing a current flow through said magnetoresistive head assembly to generate magnetic bias fields which magnetize said first ferromagnetic layer, said second ferromagnetic layer, said third ferromagnetic layer and said fourth ferromagnetic layer such that said first and said fourth ferromagnetic layers are magnetized substantially antiparallel to each other, said first and said second ferromagnetic layers are magnetized substantially perpendicular to each other, and said third and said fourth ferromagnetic layers are magnetized substantially perpendicular to each other, and d) means for differentially sensing the variations of said first and second trilayers of said magnetoresistive head assembly in response to said magnetically recorded signals.

9. The magnetoresistive head assembly of claim 8, wherein said first and said fourth ferromagnetic layers are substantially identical in magnetic and electrical properties, and said second and said third ferromagnetic layers are substantially identical in magnetic and electrical properties.

10. The magnetoresistive head assembly of claim 8, wherein said ferromagnetic layers are layers fabricated from the at least one of the group consisting of Co, Fe, and Ni.

11. The magnetoresistive head assembly of claim 10, wherein said first and said second conductive non-magnetic non-antiferromagnetic single layers are fabricated from at least one of the group consisting of Au, Ag, and Cu.

12. The magnetoresistive head assembly of claim 8, wherein said first, said second, said third, and said fourth ferromagnetic layers are each of equal thickness.

13. The magnetoresistive head assembly of claim 8, wherein said first and said second conductive non-magnetic non-antiferromagnetic single layers are each of a thickness less than the thickness of each individual layer of said ferromagnetic lagers.

14. The magnetoresistive head assembly of claim 8, wherein said conductive non-magnetic non-antiferromagnetic spacer has a resistivity higher than that of said first and second trilayers.

* * * * *